Sept. 4, 1934.  G. WALTHER  1,972,610

METAL WHEEL

Filed Aug. 8, 1927

INVENTOR,
George Walther,
BY Horace S. Smith
His ATTORNEY.

Patented Sept. 4, 1934

1,972,610

UNITED STATES PATENT OFFICE 1,972,610

METAL WHEEL

George Walther, near Dayton, Ohio, assignor to The Dayton Steel Foundry Company, Dayton, Ohio, a corporation of Ohio Application August 8, 1927, Serial No. 211,330

2 Claims. (Cl. 301—13)

It is the principal object of my invention to provide loose wedging, spacing and aligning units for application to the spider of a metal wheel at the ends of certain spokes after the tire rims are applied to the permanent units on the remaining spokes, to true up and tighten the tire rims against all the spoke ends. It is thus possible easily to apply the tire rims to the spider of a metal wheel and perfectly align, true up and tighten them upon it.

Other important and incidental objects will be brought out in the following specification and particularly set forth in the subjoined claims.

Figure 2:
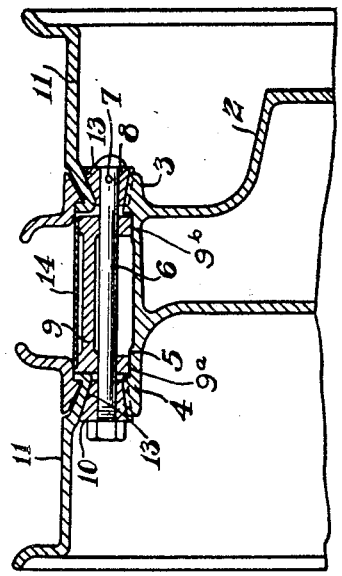
Figure 4:
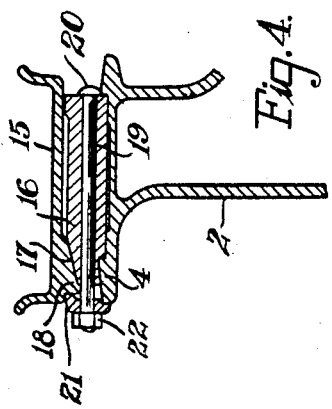
Figure 1:
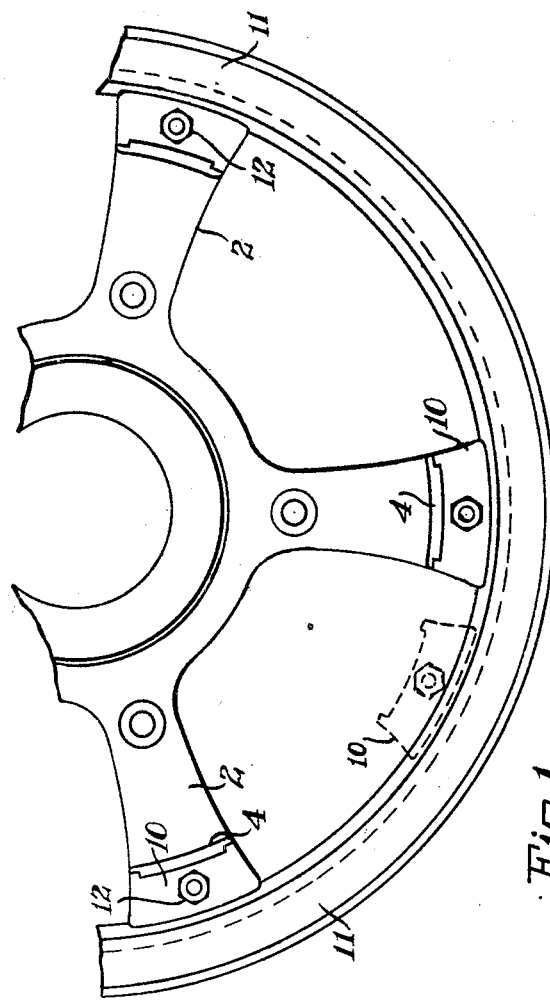
Figure 3:
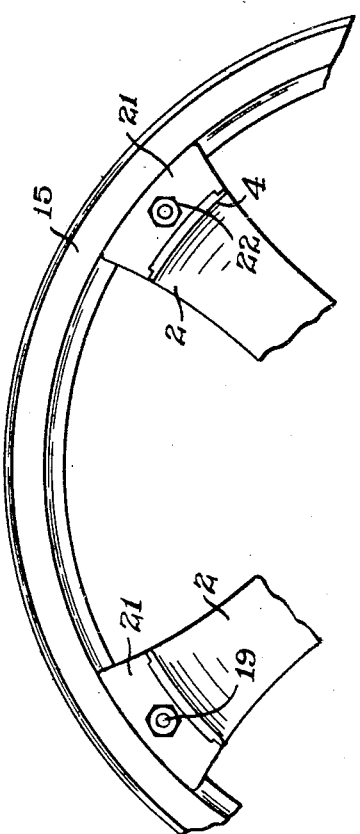

In the accompanying drawing, Figure 1 is a partial side elevational view of my improved dual pneumatic wheel. Figure 2 is a radial sectional view taken through the same, showing one of the bolt units for securing the tire rims to the spider. Figure 3 is a partial side elevational view of my improved metal wheel upon whose spider a single tire rim is mounted. And Figure 4 is a radial sectional view taken through said wheel, showing the bolt unit for securing the single tire rim to the spider.

Referring to the accompanying drawing, the numeral 1 designates the hub of a metal wheel to which a hub extension, such as the spider 2, is secured. Each spoke end of the spider is formed at its periphery with a laterally inner beveled part 3 and a laterally outer beveled part 4, these parts being formed to provide between them a spacer-receiving groove 5. The numeral 6 designates a bolt to the head end of which there is permanently secured by a pin 7 or other suitable means, a wedge 8. The middle portion of said bolt carries a spacer 9, while upon its laterally outer end there is a wedge 10. The numerals 11, 11 designate two tire rims which are applied to the spider as follows.

To a few of the spoke ends of the spider, the bolt unit that I have just described may be permanently secured. In a five spoke spider, these bolt units may be welded to three of the spokes, while in a spider having an even number of spokes, one half of the bolt units may be loose and the other half stationary. In Figure 1 the middle bolt unit is loose and the one to the right is fixed. Upon these permanently secured units, one of which is shown in Figure 2 welded to the spoke periphery at the points 9ª and 9ᵇ, the tire rims 11, 11 are first hung. Thereafter the loose bolt units are applied by first placing them upon the inner surfaces of the tire rims 11, 11, with the spacers 9 between their beveled portions 13. (See the dotted line view in Figure 1 of a loose bolt unit before it is slid along the tire rim bevels to its position upon its respective spoke.) Each assembled loose bolt unit is then slid along the tire rim bevels to a position upon the seats 3 and 4 of its respective spoke end of the spider. When the loose bolt units are so inserted, the spacers 9 will enter the grooves 5 in the spoke ends of the spider to first align the tire rims, after which, the nuts 12 on the bolts are tightened. When these nuts are tightened upon the loose bolts 6, the wedges 8 and 10, through their engagement with the beveled portions 13 of the tire rims, will force the latter into firm engagement with the spacers 9 to solidly secure the tire rims upon the spider.

After the laterally inner tire rim 11 and the spacers 9 are applied, a band 14 is slipped over the spacers 9 to protect them against dirt and other foreign substances and to direct air to the brake drum (not shown).

In Figures 3 and 4, I have shown a single tire rim 15 applied to the spoke ends of the spider 2 by the following means. Adapted to be received by the grooves 5 in the spoke ends of the spider is a supporting member 16 having a hollow center and an inset front part which fits against the beveled seat 4 of each spoke end and which also extends to a point near the laterally outer edge of it. The front laterally outer part 17 of the spacing members 16 is beveled to form a seat for the beveled part 18 of the single tire rim 15.

Each tire rim supporting member 16 is mounted on a bolt 19 whose head 20 engages the rear end of said member and whose front end projects beyond the latter to receive a wedge clamp 21. These clamps 21 are so formed as to engage the beveled part 18 of the tire rim and the spoke ends when the nuts 22 are tightened to hold the tire rim 15 solidly on the spider.

It is thus obvious that through the means I employ, one or more tire rims may be easily and solidly secured to the spider of my improved metal wheel.

In a wheel with five spokes such as I have shown, two of the bolt units are permanently secured to the spider and three of them are loose. In a wheel with an even number of spokes, it is preferred that one half of the bolt units be permanently secured to the spider and that the other half of them be loose.

Having described my invention, I claim:

1. A metal wheel comprising a hub and spokes, an inboard seat and an outboard seat on each spoke end, an overhanging tire rim for each seat, a spacer fixedly secured between said tire rims to some of said spoke ends, bolts passing through said spacers, wedge members carried by the ends of said bolts, said wedge members located between the adjacent margins of the said rims and the said seats, nuts on said bolts, and loose bolt assemblies, each comprising a spacer, end wedge members, a bolt passing therethrough, and a nut, the spacers adapted to be slid into anchored positions between the seats on the remaining spoke ends, with the wedge members adapted to be moved simultaneously into positions between the adjacent margins of the said rims and the said seats to aline them against the anchored spacers when the nuts are tightened.

2. A metal wheel formed with a hub and spokes, two seats on the periphery of each spoke, two spaced shoulders, one on each side of the periphery of each spoke, said seats being formed to provide said shoulders, a tire rim for each seat, wedging means between the adjacent margins of the said rims and the said seats, spacing means between each shoulder and a tire rim, and means for drawing said wedging means toward each other to engage each wedging means with the adjacent margin of its respective tire rim to bring said margin into engagement with its anchored spacing means.

GEORGE WALTHER.